US 6,501,287 B1

(12) United States Patent
Baldwin

(10) Patent No.: US 6,501,287 B1
(45) Date of Patent: Dec. 31, 2002

(54) APPARATUS AND METHOD FOR MEASURING THICKNESS

(75) Inventor: Peter Ian Baldwin, Wilmslow (GB)

(73) Assignee: Elcomenter Instruments Limited, Manchester (GB)

( * ) Notice: Subject to any disclaimer, the term of this patent is extended or adjusted under 35 U.S.C. 154(b) by 20 days.

(21) Appl. No.: 09/706,367

(22) Filed: Nov. 3, 2000

(30) Foreign Application Priority Data

Nov. 5, 1999 (GB) ................................................ 9926213

(51) Int. Cl.⁷ ........................ G01R 27/08; G01R 27/26; H01F 30/12
(52) U.S. Cl. ........................ 324/708; 324/685; 324/670; 324/76.75
(58) Field of Search ................................ 324/671, 654, 324/655, 670, 685, 76.75, 708, 656, 230, 229

(56) References Cited

U.S. PATENT DOCUMENTS

| | | | | |
|---|---|---|---|---|
| 3,501,696 A | * | 3/1970 | Riley ........................... 324/95 |
| 4,567,437 A | * | 1/1986 | Hubbard ...................... 324/230 |
| 5,293,132 A | * | 3/1994 | Koch ........................... 324/671 |
| 5,467,014 A | * | 11/1995 | Nix ............................. 324/230 |
| 5,694,045 A | * | 12/1997 | Ikeda et al. .................. 324/652 |

* cited by examiner

*Primary Examiner*—N. Le
*Assistant Examiner*—Anjan K. Deb
(74) *Attorney, Agent, or Firm*—Salter & Michaelson

(57) ABSTRACT

Apparatus are provided for measuring coating thickness. The apparatus include first and second inductors, which may be coils, and measuring the impedance of conductors by passing alternating current through the conductors. The conductors are arranged so that the first inductor may be positioned sufficiently close to a conductive surface so that its impedance changes and, when so positioned, any change in the impedance of the second inductor brought about by the surface is negligible compared to that in the impedance of the first. A microprocessor is provided and arranged to calculate a temperature compensated thickness measurement from the measured impedances of both inductors.

29 Claims, 1 Drawing Sheet

APPARATUS AND METHOD FOR MEASURING THICKNESS

BACKGROUND

1. Technical Field

The present invention relates to an apparatus and method for measuring thickness and, in particular, to an apparatus and method for measuring the thickness of non-electrically conductive coatings on electrically conductive substrates and of electrically conductive materials, including electrically conductive coatings on nonelectrically conductive substrates.

2. Related Art

A number of types of coating thickness measuring instrument are known. One method used by such instruments to determine coating thickness is the so-called eddy current method. This method relies on the fact that the impedance of a coil carrying an alternating electric current varies in dependence on the distance of the coil from an electrically conductive surface. Instruments using this method typically include a probe including a coil. The probe is placed in contact with a coated conductive substrate, thereby placing the coil a predetermined distance from the substrate. An alternating current is applied to the coil and its impedance measured. This enables the distance from the coil to the substrate to be measured, from which the predetermined distance can be subtracted to obtain the thickness of the coating.

One way of measuring the impedance of a coil is to incorporate it into an LC oscillator the frequency of oscillation of which depends on the impedance of the coil. Impedance can then be determined from the frequency of oscillation. One apparatus using this approach is disclosed in U.S. Pat. No. 5,241,280.

A problem with the eddy current method is that the impedance of a coil is usually temperature dependent. Therefore, variations in ambient temperature can affect the accuracy of measurements made using a coil based measuring instrument.

U.S. Pat. No. 5,828,212 discloses a coating thickness measuring instrument including a magnetic field responsive sensor means, a measuring means for measuring the temperature dependent internal resistance of the sensor means and temperature compensation means connected to the measuring means for compensating for temperature drift of the measuring means. It appears from the disclosure that the instrument determines the temperature of the sensor and then makes an appropriate compensation based on the determined temperature. This is a rather complex approach because it is necessary to know the temperature response of the sensor in order to make an appropriate correction. Also, the temperature response of a sensor may change over time which cannot be compensated for by this instrument.

It is an object of the present invention to overcome, or at least mitigate, the above problems. It is also an object to provide an improved apparatus and methods for measuring thickness using the eddy current method which compensate for the effects of temperature.

It is another object of the present invention to provide an apparatus for measuring coating thickness which is sufficiently economical to produce so that it can be made available at a cost which is acceptable to an occasional lay user and which is able to indicate measured values in a way which is easy to understand by a lay user. Attempts have been made to provide a simplified instrument for use by lay persons, such as that described in U.S. Pat. No. 5,828,192, which discloses the use of a simplified display including three display elements to indicate the range into which a coating thickness measured by a conventional apparatus falls. Another such instrument is described in GB 2108672. Since both instruments employ conventional coating thickness apparatus they are restricted to measuring coating thickness on only ferrous or only non-ferrous substrates. Although instruments for measuring thickness on both ferrous and non-ferrous substrates are known, such as that described in U.S. Pat. No. Re. 35,703, they tend to be complex and costly and are therefore unsuitable for occasional use by lay persons. It is a further object to provide apparatus that is able to measure coating thickness on both ferrous and non-ferrous substrates.

It is a particular object to provide a low cost, easy to use, compact instrument for use in the automotive industry to detect if repair work has been carried out on automotive bodies which provides for some temperature compensation.

Other objects, features and advantages of the invention shall become apparent as the description thereof proceeds when considered in connection with the accompanying illustrative drawings.

SUMMARY

According to an aspect of the present invention there is provided an apparatus for measuring thickness including first and second inductors each forming part of a respective tuned oscillator circuit the resonant frequency of which varies with the impedance of the inductor, means for causing an alternating current to flow in each circuit, and hence inductor, means for measuring the frequency of oscillation of alternating current in each circuit and processing means, the inductors being arranged so that the first inductor may be positioned sufficiently close to a conductive surface so that its impedance changes and, when so positioned, any change in the impedance of the second inductor brought about by the surface is negligible compared to that in the impedance of the first inductor, and the processing means being arranged to determine a temperature compensated thickness measurement from the measured frequencies of oscillation.

According to another aspect of the present invention there is provided a method of measuring thickness including the steps of providing a first inductor forming part of a first tuned oscillator circuit the resonant frequency of which varies with the impedance of the inductor, positioning it close to a surface from which a measurement is to be taken, causing an alternating current to flow in the first circuit, measuring the frequency of oscillation of the inductor, providing a second inductor forming part of a second tuned oscillator circuit the resonant frequency of which varies with the impedance of the inductor, positioning it away, or otherwise isolating it, from the surface so that any effect the surface has on its impedance is negligible compared to any effect the surface has on the impedance of the first inductor, while exposing both inductors to substantially the same environmental conditions, measuring the frequency of oscillation of the second circuit and determining from the measured frequencies a temperature compensated thickness measurement.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when taken in conjunction with the accompanying drawings in which.

DETAILED DESCRIPTION OF THE PREFERRED EMBODIMENTS

Figure 3:
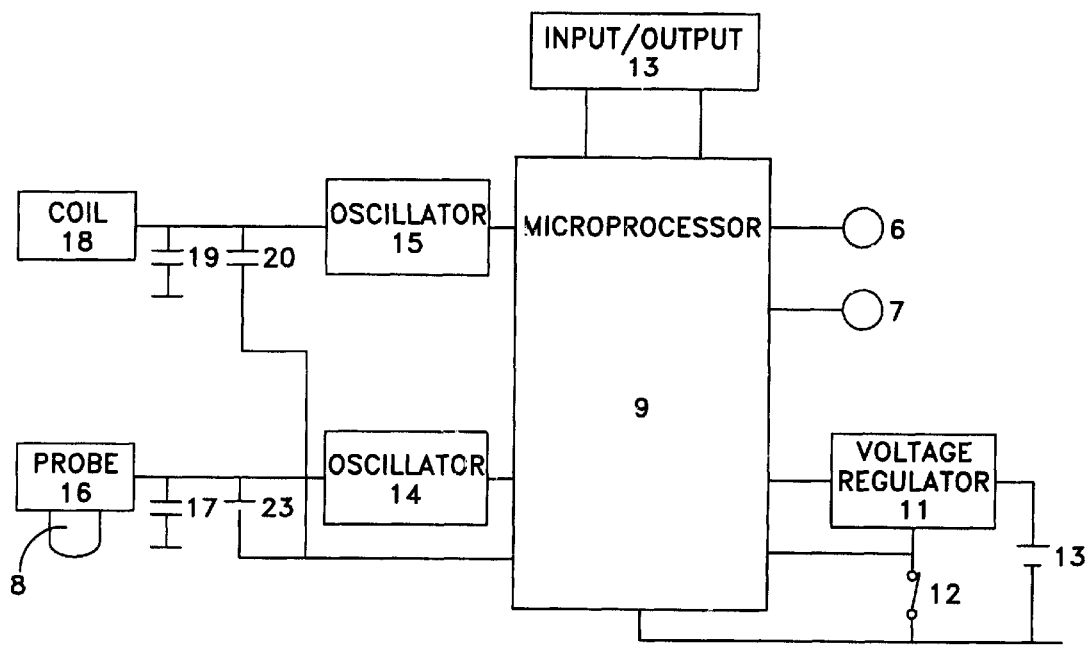
FIG. 3 is a schematic block diagram of the circuit and components of the instrument of FIG. 1.

The present invention is directed to an apparatus for measuring thickness. The apparatus is compact, simple to use, and can be manufactured at a low cost, yet still provides reasonable accuracy when used to measure both ferrous and non-ferrous materials while overcoming the temperature dependence problems associated with existing instruments.

It is possible, using the known current eddy method, by measuring the impedance of a first inductor, to determine its distance from a conductive surface, and therefore, if the inductor is placed a known distance from a non-conductive coating on the conductive surface, the thickness of that coating. It is also possible to determine the thickness of a conductive material, for example the thickness of a conductive coating on a non-conductive substrate, because this too has an effect on the impedance of an inductor carrying an alternating current. This is because the thickness of a conductive material affects magnetic circuit reluctance. As material thickness reduces so the eddy currents induced in the material by an alternating current carrying inductor reduce which in turn affects the impedance of the inductor. For good accuracy the frequency of the alternating current should be selected appropriately according to whether thickness of a non-conductive coating on a conductive substrate or thickness of a conductive material is to be measured.

By providing a second inductor and positioning it so that its impedance is not affected by the surface being measured it is possible to determine a reference value which is only affected by temperature and other environmental conditions experienced by both inductors and use this to subtract the effects of these from the measured impedance of the other inductor to obtain an impedance which is independent of temperature and other conditions. By using a reference inductor no detailed knowledge of the temperature dependence of the inductor's impedance is required.

The first and second inductors are preferably of substantially the same impedance. The impedance of both inductors preferably have substantially the same temperature dependence. The two inductors may be arranged so that the effect on the impedance of the second inductor is negligible compared to the effect on the impedance of the first when the first inductor is positioned close to a conductive surface though being spaced apart. They are preferably spaced apart by at least 10 mm. Alternatively, a barrier could be disposed between the inductors, for example a metal plate.

The inductors are preferably arranged so that they are both exposed to substantially the same environmental conditions, particularly temperature.

The inductors are preferably both coils, first and second coils. The first coil preferably has a highly permeable core, for example a ferrite rod. The ferrite rod will focus and intensify the magnetic field produced by the coil and hence increase the measuring range of the instrument. The first coil is preferably disposed in a probe having a probe tip. The outside surface of the probe tip is preferably hemispherical in shape.

Each tuned oscillator circuit preferably includes a capacitor. The means for causing current to flow in each circuit may be based upon a high gain amplifier or comparator and the means for measuring frequency may include a programmed microprocessor. The frequency of oscillation is preferably determined by measuring the time taken for a number of oscillations to occur. The frequency of oscillation is preferably less than 100 KHz. This is much less than the frequencies used by conventional apparatus using the eddy current principle. As such it enables the electronics of the instrument to be simplified compared to those of known instruments while still enabling thickness measurements of accuracy sufficient for the occasional user to be made.

Means may be provided for varying the resonant frequency of the two circuits. This may include two or more additional capacitors which may be switched into the respective circuits by the microprocessor in place of, or in parallel or in series with, the capacitors of the circuits. This would enable the frequency of the oscillation of the current in the circuit to be optimised for a particular application of the instrument. In particular, the resonant frequency of the two circuits may be switched between about 30 KHz and about 50 KHz.

The processing means may include a programmable microprocessor. It is preferably arranged to obtain a temperature compensated impedance for the first coil by subtracting the measured impedance of the second coil from that of the first. In particular, it may subtract the time taken for a given number of oscillations to occur in the circuit including the second coil (the reference circuit) from the equivalent value for the circuit including the first coil (the probe circuit). By doing so any variation in the impedance of the coils due to temperature, or any other environmental effect conditions experienced by both coils, will be cancelled out, as will the "free air" impedance (i.e. impedance when the coils are well away from any conductive material) of the coils. The resultant value will therefore be related to the temperature independent change in impedance of the first coil brought about by moving it from "free air" to a position close to a conductive surface. This value is related to the distance of the coil from the conductive surface and/or the thickness of conductive material underlying that surface.

Ideally, the difference between the values for each circuit when both coils are in "free air" should be zero. In practice, however, differences in the two circuits, and other factors, mean that this is generally not so.

The processing means is therefore also preferably arranged to subsequently subtract from the temperature compensated value an equivalent value obtained when both coils are in "free air" (the offset value).

The impedance of a coil increases when it is brought towards a ferrous material and decreases when brought towards a non-ferrous material. Therefore, when the probe tip is placed into contact with a non-conductive coating on either a ferrous or non-ferrous conductive substrate the sign and magnitude of the value calculated by the microprocessor will be indicative of the type of substrate and thickness of the coating.

The apparatus preferably also includes an indicating means for indicating information relating to the thickness measurement. This may include two or more elements, for example lamps one of which may display more than one color.

The processor means may be arranged to illuminate one lamp depending on the sign of the calculated value, to indicate either a ferrous or non-ferrous material, and to cause the other lamp to show a different color depending on the range in which the magnitude of the value falls. This could be to indicate a normal thickness of paint, double thickness or greater thickness indicative of filler on an automotive body.

Threshold values for illuminating the lamp may be programmed into the processing means and would depend upon the application for which the apparatus is to be used.

In an alternative embodiment a numeric or alphanumeric display could be provided to display actual thickness values.

The apparatus is preferably disposed in a housing from which the probe tip protrudes. The probe may be spring loaded, so that it may be pressed into the housing but will return to its original position under action of the spring. The housing may include one or more controls, in particular a switch for switching on the apparatus. The apparatus is preferably battery powered and has provision for storing a battery in the housing.

It is found that the "free air" impedance of the coils tends to vary. Provision is therefore preferably made to recalibrate the apparatus by storing a new offset value, obtained by operating the apparatus away from conductive materials. It is found that providing the offset value is re-stored as required the various threshold values for a particular application may stay the same to provide accuracy sufficient for the occasional user.

A control may be provided on the housing to enable a new offset value to be stored.

Provision may be made to re-program the microprocessor to enable the apparatus to be used for different functions.

Figure 1:
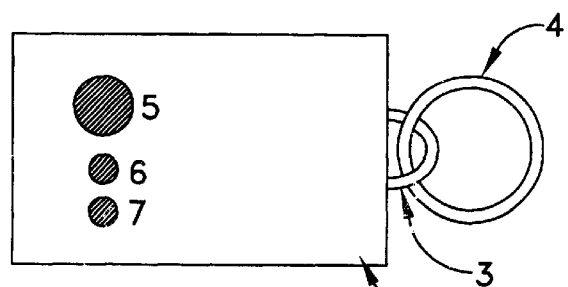
FIG. 1 shows a plan view of one embodiment of a thickness measuring instrument.
Figure 2:
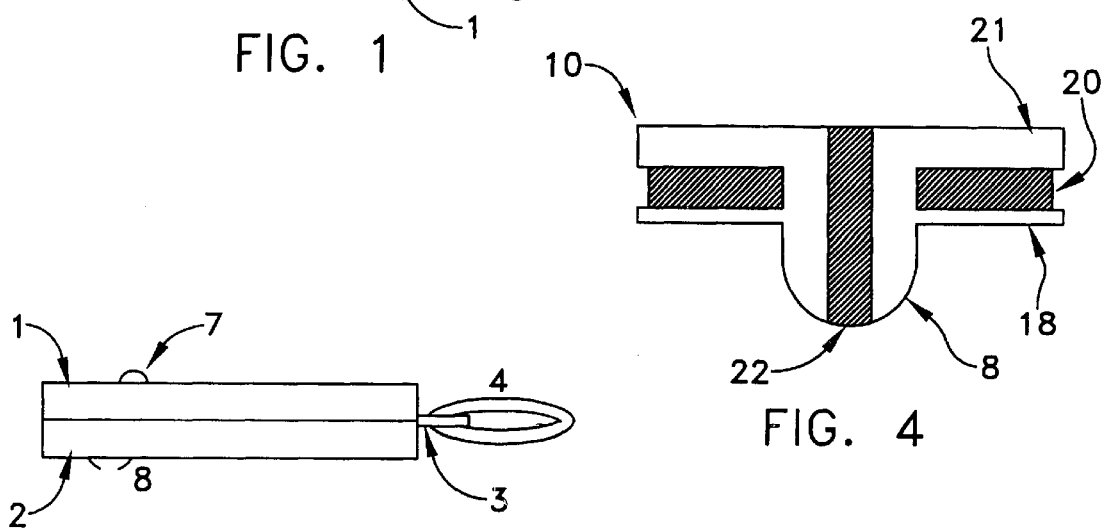
FIG. 2 shows a side view of the instrument of FIG. 1.

FIGS. 1 and 2 illustrate one embodiment of a thickness measuring instrument including a generally cuboidal housing formed from two plastic components 1 and 2. Fastened to the housing is a loop 3 through which there is threaded a split ring 4, which can be used as a key ring. The housing is sized so that it can be comfortably held in the hand and will fit into a pocket in clothing.

Mounted behind apertures formed through the top surface of the housing as illustrated are a button 5 for operating a switch, a single color light emitting diode (LED) 6 and a three color LED 7 capable of showing red, yellow and green. Mounted behind an aperture formed through the underside of the housing is a spring loaded measuring probe the hemispherical tip 8 of which protrudes through the aperture. The probe is urged towards the aperture, away from the housing, by a spring (not shown) and may be depressed into the housing from which it will return under action of the spring. In use the tip 8 of the probe is placed adjacent to surfaces from which measurements are to be taken. As the tip 8 protrudes from the housing it can easily be placed against flat, convex and some concave surfaces.

Figure 4:
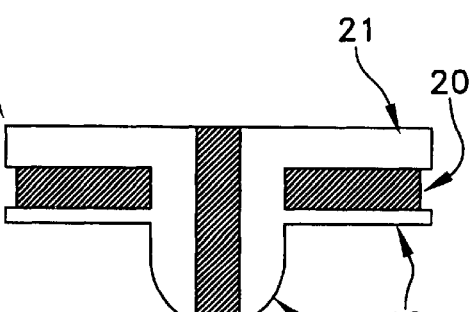
FIG. 4 is a cross sectional view of the probe of the instrument of FIG. 1.

Further components are mounted in the housing. These are shown in FIGS. 3 and 4. Referring additionally to these FIGS. the instrument includes a programmable microprocessor 9. This is powered by a small alkali battery 10 to which it is connected via a regulator 11 which controls the power supply to and provides a stable voltage for the microprocessor. The microprocessor 9 is also connected to a normally open switch 12 which can be closed by depressing and holding button 5 to establish a connection between one side of the battery 10, the microprocessor 9 and regulator 11. The microprocessor 9 is also connected to LEDs 6 and 7 and an input/output port 13 which is accessible through opening the housing by separating components 1 and 2. Alternatively an aperture could be provided in the housing to allow access to the port. This enables the instrument to be connected to other apparatus, for example a display or a computer to reprogram the microprocessor 9.

The microprocessor 9 is also connected to two oscillators 14 and 15. Oscillator 14 is connected in parallel to a measuring probe 16 and a capacitor 17.

The probe 16 is shown in greater detail in FIG. 4. Probe 16 includes a coil 20 wound around a plastic former 21 which defines an aperture which houses a cylindrical ferrite rod 22 so that it is coaxial with the coil 20. The former 21 also provides the hemispherical tip 8 of the probe 16 which is centered about the axis of the coil 20 and rod 22 which extends to just inside the outside surface of the tip 8. Coil 20 is located approximately two thirds of the way along the rod, away from the probe tip 8. In use the probe tip 8 is placed in contact with a surface from which measurements are to be taken, preferably so that the axis of the coil 20 and rod 22 is perpendicular to the surface. The hemispherical surface of the probe tip 8 helps to reduce measurement errors due to angular misalignment of the probe. The ferrite rod 22 is highly permeable and causes the magnetic field produced by a current flowing in the coil 20 to extend well beyond the coil. Without the ferrite rod 22 the range of the instrument would be very limited. Operation of the instrument is discussed in more detail below.

Oscillator 15 is connected in parallel to a coil assembly 18 including a coil wound around a former with a ferrite rod core similar to that of the probe 16, but without a tip, and a capacitor 19 which is similar to capacitor 17. In particular, the coil of the coil assembly 18 is of substantially identical impedance to that of the probe 16 and the impedance of both coils have a substantially identical temperature dependency. Capacitors 17 and 19 also have substantially identical capacitance and temperature characteristics. Coil assembly 18 is spaced apart from the probe 16 by about 10 mm.

Two additional capacitors 23 and 24 are also provided, both having substantially identical capacitance and temperature characteristics. These capacitors may be switched, by the microprocessor 9, to operate in parallel or series with capacitors 17 and 19 respectively.

When a coil is brought close to a conductive material its impedance changes. The instrument uses this effect to measure the thickness of non-conductive coatings on conductive substrates and the thickness of conductive materials. In use the tip 8 of the probe 16 is placed into contact with a surface from which measurements are to be taken and the instrument determines the change in impedance of coil 20 located in the probe 16 as a result of placing the probe in contact with the surface. From the change the instrument can determine either the thickness of a coating on the surface of a conductive substrate or the thickness of a conductive material, for example a thin metallic sheet or conductive coating. The oscillator 14, coil 20 and capacitor 17 together form a tuned oscillator circuit having a resonant frequency at which an alternating current will preferentially oscillate when driven by the oscillator 14. The resonant frequency is a function of the impedance of the coil 20 and capacitance of the capacitor 17. By comparing the resonant frequency when the probe 16 is in "free air" and near to a conductive surface it is possible to determine the change in impedance of the coil 20 brought about through moving the coil towards the conductive surface and hence either the thickness of a non-conductive coating on the surface, or thickness of conductive material underlying the surface.

The operation of the instrument will now be described in more detail.

To switch the instrument on button 5 is pressed to close switch 10. Closing switch 10 causes the regulator 11 to allow power to flow to the microprocessor 9. This is arranged so that if the switch 10 is held closed for at least about two seconds and then released the regulator 11 will continue to supply power to the microprocessor 9 for about a minute before switching off. This reduces the risk of the instrument being accidentally turned on, or left on for long periods, and thereby conserves battery power.

As mentioned above oscillator 14, coil 20 and capacitor 17 together form a tuned LC oscillator circuit (the probe circuit). Oscillator 15, the coil of coil assembly 18 and capacitor 19 also form a tuned circuit (the reference circuit). As mentioned above the coil assembly 18 and capacitor 19 of the reference circuit have characteristics which are substantially identical to those of the coil 20 and capacitor 17 of the probe circuit. The purpose of the reference circuit is to enable measurements taken using the probe circuit to be corrected for the effects of temperature change as both the impedance of coils and capacitance of capacitors typically varies with temperature. The coil assembly 18 is spaced sufficiently far from the probe 16 so that the change in its impedance when the probe 16 is brought towards and into contact with a conductive surface, from well away from any conductive material, is negligible compared to the change in impedance of coil 20.

When the instrument is switched on the microprocessor 9 causes both oscillators 14 and 15 to output a pulse of current to start an alternating current oscillating in both the probe and reference circuits, and to subsequently maintain the oscillations. In both circuits the current oscillates at about 30 KHz. The microprocessor then measures the frequency of oscillations in both circuits. This is achieved by measuring the time taken for a given number of oscillations to occur. Typically 250 cycles are measured with the first 10 cycles being ignored while the oscillations stabilize. Additional stability in the measured value may be obtained by averaging a set of values. The measured value for the reference circuit is then subtracted from that of the probe circuit to give a temperature independent value related to the frequency of oscillation of the probe circuit and hence the impedance of coil 20. The value for the probe circuit will vary depending upon where the probe is placed. The microprocessor 9 then subtracts from this value an 'offset' value stored by the microprocessor to arrive at a final calculated value. The offset value is the difference between the time to count a given number of oscillations in the probe and reference circuits when the instrument is placed away from any conductive material, that is, a value calculated in "free air." Therefore, if the instrument is operated in "free air" the final value calculated by the microprocessor should be zero.

Now, when carrying an alternating current of frequency about 30 KHz the impedance of a coil increases when it is brought towards a ferrous conductive material and decreases when it is brought towards a non-ferrous conductive material. Therefore, if the probe tip is moved towards a conductive ferrous substrate the impedance of coil 20 will increase. This will decrease the resonant frequency of the probe circuit, increasing the time taken to count a given number of oscillations. The resonant frequency of the reference circuit will remain largely unaffected and therefore the final value calculated by the microprocessor, after subtracting the reference circuit and offset values from the probe circuit value, will be greater than zero. Similarly if the probe tip is moved towards a non-ferrous conductive material the final value will be less than zero.

The magnitude of the final value will depend upon proximity of the probe tip to the surface of a conductive material, the type of material and other parameters for example the thickness of the material.

It is found that the impedance of the coils in "free air," and hence the resonant frequency of the circuits in "free air," tends to vary. To avoid the effect of this on measurements provision is made to recalibrate the instrument by storing a new offset value. This is achieved by closing switch 10 for at least five seconds, the instrument will then operate and store the difference between the time taken to count a predetermined number of oscillations in the probe and reference circuits as a new offset value, replacing the previous offset value. Thus to recalibrate the instrument the button 5 should be depressed for at least five seconds while the instrument is away from any conductive material, i.e. in "free air."

The results of taking a measurement are displayed to the user by means of LEDs 6 and 7 which are illuminated by the microprocessor 9 in dependence upon the final calculated value. How illumination of the LEDs depends upon the final calculated value is programmed into the microprocessor and will depend upon the application for which the instrument is to be used.

One typical application is testing the paint thickness on automotive body panels i.e. the thickness of a non-conductive coating on a conductive substrate. The microprocessor 9 would be arranged to illuminate LED 6 if a positive final value were determined, but not if a negative final value were determined. Illumination of LED 6 would thus be indicative of a ferrous substrate. LED 7 could be caused to show green, yellow or red depending on the magnitude of the final value. Green could be illuminated when a normal paint thickness is detected, which is typically about 80–140 microns, yellow when an increased coating thickness is detected, for example about 140 to 250 microns, indicating over coating, and red when a still greater coating thickness is detected, for example, over 250 microns indicating that a panel has been filled and coated. The actual threshold values at which the LED 7 is illuminated and color changes occur can be determined by experiment and programmed into the microprocessor. Additional thresholds could be indicated by flashing LED 7, possibly at one of a number of different rates, when showing any of its three colors.

When switched on the instrument continually monitors the tuned oscillator circuits and illuminates the LEDs accordingly. Were the instrument operating as described above, to measure coating thickness, and LED 7 were to illuminate when the instrument was away from conductive materials this would be an indication that the instrument should be recalibrated by pressing and holding the button 5 for at least five seconds.

By switching in additional capacitors 23 and 24 to the probe and reference circuits respectively it is possible to vary the capacitance in the circuits and hence alter their resonant frequency. Changing the frequency of oscillation of the circuits may be desirable for particular applications. For some materials, the extent to which they affect the impedance of the probe coil 20 may vary considerably with frequency. In this case the microprocessor may be arranged to calculate values using more than one frequency and then use this to determine a result that is less frequency dependent. By switching in additional capacitors 23 and 24 appropriately it is possible to increase the frequency of oscillation of the circuits to about 50 KHz. The instrument could be arranged to allow oscillations to occur at other frequencies. A suitable frequency for measuring the thickness of copper in the range 10 to 100 μm is about 50 KHz.

Because the microprocessor is programmable the instrument can easily be programmed and reprogrammed to perform different applications, for example to assess the thickness of a conductive material such as thin metals or conductive coatings. Different threshold values and operating frequency are required depending on the application and type of material to be measured. Instruments could be factory pre-programmed and sold for a particular purpose, or provision could be made for the user to re-program the instrument or to switch between a number of different factory set programs.

The instrument is relatively simple with few components and consequently compact and economic to manufacture.

The instrument could also be connected to a display or other device to indicate numerical thickness values.

Although particular embodiments of the invention have been described in detail for purposes of illustration, various changes and modifications may be made without departing from the scope and spirit of the invention. All combinations and permutations of the apparatus and operational methods are available for practice in various applications as the need arises. Accordingly, the invention is not to be limited except as by the appended claims

What is claimed is:

1. An apparatus for measuring thickness, comprising:
   a first inductor and a second inductor, each inductor having an impedance, each inductor forming part of a tuned oscillator circuit, each tuned oscillator circuit having a resonant frequency which varies with the impedance of the inductor;
   means for causing an alternating current to flow in each tuned oscillator circuit;
   means for measuring the frequency of oscillation of the alternating current flowing in each tuned oscillator circuit;
   processing means arranged to determine a temperature compensated thickness measurement from the measured frequencies of oscillation;
   wherein the inductors are arranged so that the first inductor is positioned sufficiently close to a conductive surface so that its impedance changes and, when so positioned, any change in the impedance of the second inductor brought about by the surface is negligible compared to that in the impedance of the first inductor.

2. The apparatus of claim 1, wherein the impedance of the first inductor is substantially the same as the impedance of the second inductor.

3. The apparatus of claim 1, wherein the impedance of the first inductor has substantially the same temperature dependence as the the second inductor.

4. The apparatus of claim 1, wherein the first inductor and the second inductor are spaced apart.

5. The apparatus of claim 1, wherein the frequency of oscillation of the alternating current in each conductor is less than about 100 KHz.

6. The apparatus of claim 1, wherein the first inductor and the second inductor are first and second coils.

7. The apparatus of claim 1, further comprising means for varying the resonant frequency of each tuned oscillator circuit.

8. The apparatus of claim 1, wherein each tuned oscillator circuit is adjustable between resonant frequencies of between about 30 KHz and about 50 KHz.

9. The apparatus of claim 1, wherein the processing means are arranged to subtract the measured frequency of oscillation of the first tuned oscillator circuit from the measured frequency oscillation of the second tuned oscillator circuit.

10. The apparatus of claim 9, wherein the processing means is arranged to subsequently subtract a stored value from the difference of the measured impedances of the first and second coils.

11. The apparatus of claim 10, further comprising means for storing a new value by storing the difference of the measured impedances of the first and second coils.

12. The apparatus of claim 9, further comprising an indicating means including two lamps, wherein the processor means is arranged to cause one of the lamps to illuminate depending on the sign of the calculated value and to cause the other lamp to illuminate depending on the range in which the magnitude of the calculated value falls.

13. The apparatus of claim 1, wherein the frequency of oscillation of the alternating current in each tuned oscillator circuit is measured by measuring the amount of time taken for a predetermined number of oscillations to occur in each tuned oscillator circuit.

14. The apparatus of claim 1, further comprising a numeric or alphanumeric display.

15. The apparatus of claim 1, wherein the processing means includes a microprocessor.

16. A method of measuring thickness, comprising the steps of:
   providing a first inductor having a first impedance, the first inductor forming part of a first tuned oscillator circuit the resonant frequency of which varies with the first impedance of the first inductor;
   positioning the first inductor proximate a surface from which a measurement is to be taken;
   causing an alternating current to flow in the first tuned oscillator circuit;
   measuring the frequency of oscillation of the first inductor;
   providing a second inductor having a second impedance, the second inductor forming part of a second tuned oscillator circuit the resonant frequency of which varies with the second impedance of the second inductor;
   measuring the frequency of oscillation of the second tuned oscillator circuit and determining from the measured frequencies a temperature compensated thickness measurement;
   wherein, isolating the second inductor from the surface so that any effect the surface has on the impedance of the second inductor is negligible relative to any effect the surface has on the impedance of the first inductor, while exposing both inductors to substantially the same environmental conditions.

17. The method of claim 16, wherein the first and second inductors are first and second coils the impedance and temperature dependency each of which is substantially the same and determining the temperature compensated thickness measurement by subtracting the frequency of oscillation of the second tuned oscillator circuit from that of the first tuned oscillator circuit.

18. The method of claim 17, wherein the frequency of oscillation is measured by measuring the time taken for a predetermined number of oscillations to occur.

19. The method of claim 17, further comprising the step of subtracting a stored offset value from the difference between the frequency of oscillation of the first and second tuned oscillator circuits.

20. The method of claim 19, further comprising the step of:
   determining the offset value by positioning both coils away from any conductive material;
   causing an alternating current to flow in each coil;
   subtracting the frequency of oscillation of current in the second coil from that of the first; and
   storing the determined offset value.

21. The method of claim 16, wherein the second inductor is isolated from the surface by being spaced apart from the surface.

22. An apparatus for measuring thickness, comprising:
   a measuring circuit and a reference circuit, each circuit including an inductor having a variable impedance, and each circuit having a resonant frequency responsive to the impedance of the inductor;
   a microprocessor constructed and arranged to measure the resonant frequency of each circuit, and to determine a temperature compensated thickness measurement from the difference in the measured resonant frequencies.

23. The apparatus of claim 22, wherein the impedance of the first inductor is substantially the same as the impedance of the second inductor.

24. The apparatus of claim 22, wherein the first inductor has substantially the same temperature dependence as the second inductor.

25. The apparatus of claim 22, wherein the first inductor and the second inductor are spaced apart.

26. The apparatus of claim 22, wherein the resonant frequency of each tuned oscillator circuit is adjustable.

27. The apparatus of claim 22, wherein the microprocessor is arranged to subtract a stored value from the difference of the measured impedances of the first and second inductors.

28. The apparatus of claim 27, further comprising means for storing a new value by storing the difference of the measured impedances of the first and second coils.

29. The apparatus claim 22, wherein the microprocessor is programmable.

* * * * *